Figure 1:
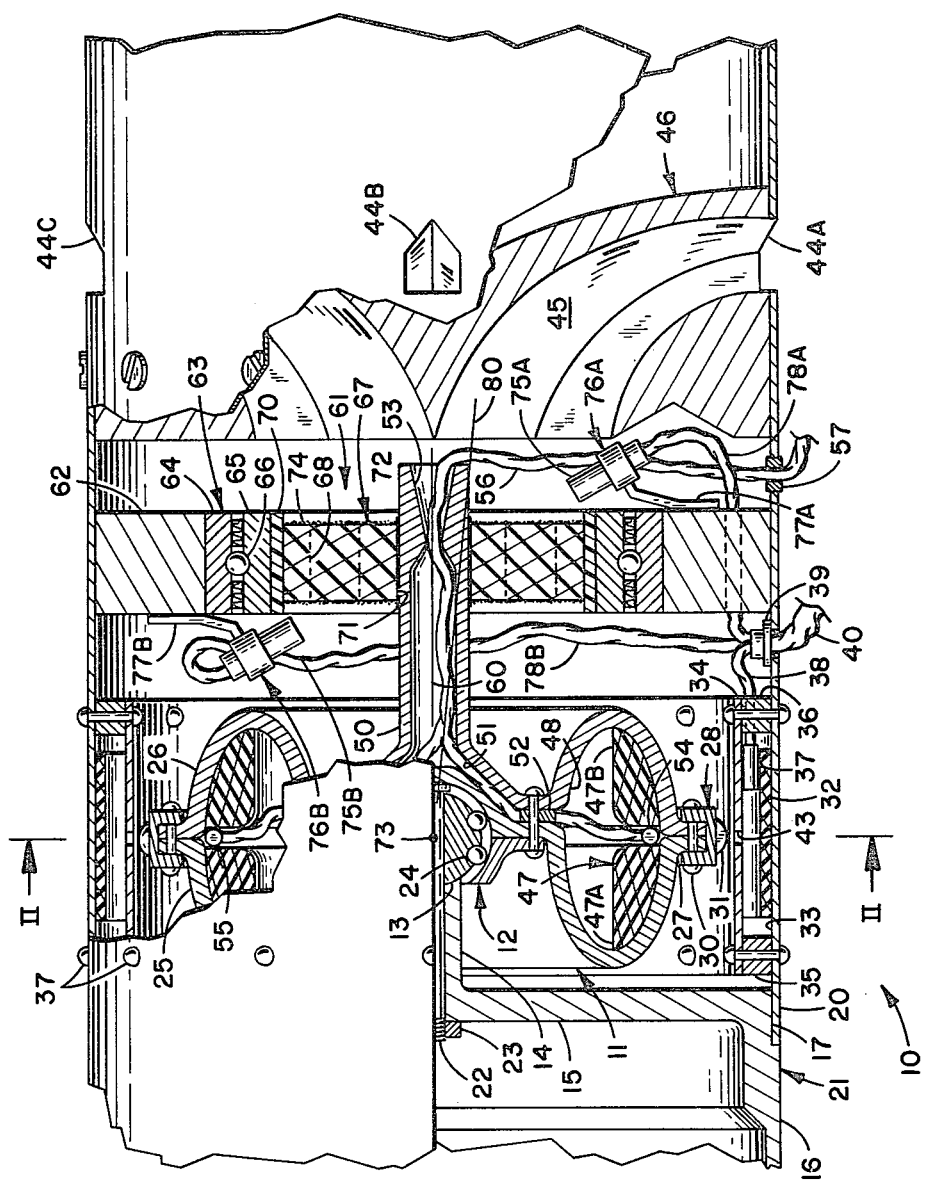

United States Patent [19]

Bard

[11] 4,147,066
[45] Apr. 3, 1979

[54] MEANS AND METHOD FOR UNCAGING A GYROSCOPE ROTOR

[75] Inventor: Donald O. Bard, Mount Clemens, Mich.

[73] Assignee: Vought Corporation, Dallas, Tex.

[21] Appl. No.: 739,676

[22] Filed: Nov. 8, 1976

[51] Int. Cl.² .................. G01C 19/24; F41G 7/00; F42B 15/02; G06F 15/50
[52] U.S. Cl. .................................. 74/5.1; 74/5.43; 74/5.7; 244/3.22
[58] Field of Search ............ 74/5 R, 5.1, 5.42, 5.43, 74/5.7; 102/DIG. 3; 244/3.20, 3.22

[56] References Cited

U.S. PATENT DOCUMENTS

| | | | |
|---|---|---|---|
| 2,412,173 | 12/1946 | Pope | 74/5.7 X |
| 2,743,576 | 5/1956 | Crockett | 74/5.7 X |
| 2,921,472 | 1/1960 | Friedman et al. | 74/5.1 X |
| 3,162,053 | 12/1964 | Blitz | 74/5.7 X |
| 3,267,748 | 8/1966 | Conklin, Jr. | 102/DIG. 3 |
| 3,280,643 | 10/1966 | Frielink | 74/5.7 |
| 3,612,443 | 10/1971 | Stripling | 244/3.2 |
| 3,645,475 | 2/1972 | Stripling | 244/3.22 |
| 3,738,179 | 6/1973 | Koltz et al. | 102/DIG. 3 |
| 3,749,334 | 7/1973 | McCorkle, Jr. | 244/3.22 |

Primary Examiner—Samuel Scott
Assistant Examiner—Don E. Ferrell
Attorney, Agent, or Firm—James M. Cate

[57] ABSTRACT

A gyroscope rotor uncaging apparatus is disclosed having a housing, a bearing structure supporting the rotor and permitting rotation of the rotor about its spin axis and about at least one other axis, and a constraining mechanism mounted on the housing at a location spaced from the first bearing structure, which initially cages the rotor for preventing rotation of the rotor about the at least one other axis. The solid propellant structure is ignited upon the rotor being accelerated and, upon the rotor being brought up to a desired rotational velocity, the solid propellant structure is consumed, whereupon the rotor is free to rotate about its at least one other rotational axis. The method of uncaging a gyroscope rotor with such an apparatus is disclosed. Also disclosed is a means for accelerating the rotor in conjunction with the uncaging apparatus.

6 Claims, 5 Drawing Figures

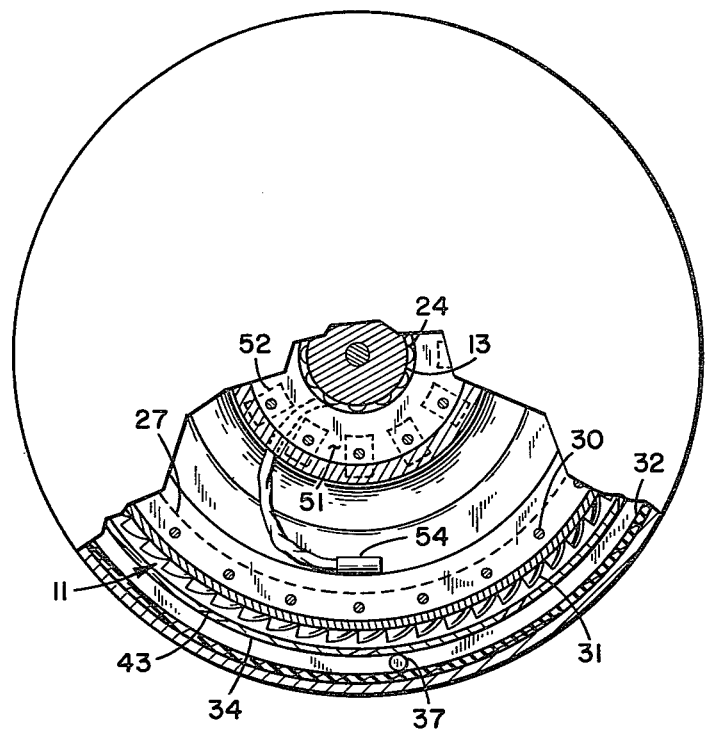
FIG II
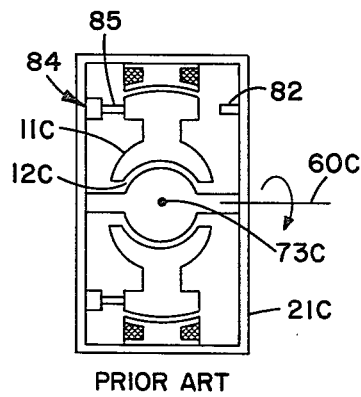
PRIOR ART
FIG III
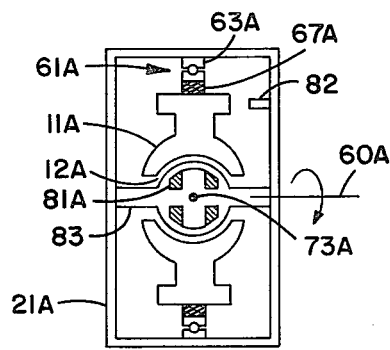
FIG IV
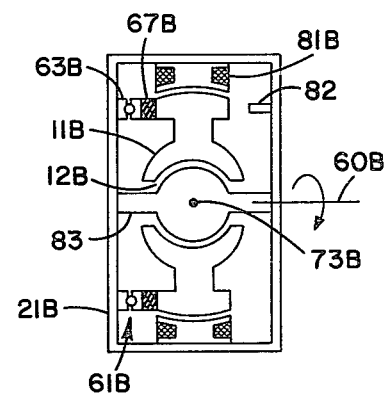
FIG V

MEANS AND METHOD FOR UNCAGING A GYROSCOPE ROTOR

This invention relates to gyroscopes and, more particularly, to a means and method for uncaging a gyroscopic rotor upon its being rotationally accelerated to a predetermined spin velocity.

A major factor contributing to the complexity and cost of modern gyroscopic instruments is the requirement for a mechanism which constrains the rotor in fixed alignment with an adjacent supporting structure during rotational acceleration, or spin up, of the rotor and which then releases or uncages the rotor, permitting it to rotate about at least one other axis relative to the adjacent structure or housing. Such uncaging mechanisms are complex and are required to be precisely constructed, because they must be capable of permitting freedom of rotation of the rotor about its spin axis, during acceleration of the rotor, at very high rotational velocities while effectively constraining the rotor in precise alignment with the adjacent housing or reference structure, yet when uncaging of the rotor is required, be capable of releasing the rotor without imparting any additional moment of force or "kick" to the spinning rotor which would reduce the precision of the instrument impartation of such a moment of force could possibly result in an undesired nutation of the rotor as it coasts subsequent to acceleration. Achieving the latter requirement is difficult in that a mechanism which cages a portion of a spinning rotor must necessarily include elements initially applying constraining forces from at least two radial directions, in the case of a rotor free to rotate in a gimbal mounting about one additional axis, and from at least three radial directions in the case of a rotor having a gimbal mounting providing two degrees of freedom. To achieve uncaging of a rotor without the impartation of any spurious moment of force to the rotor, the elements constraining the rotor must be released at precisely the same time and rate, and preferably in a rapid outward movement, in order that one such member does not remain in contact with the rotor after another, opposite member has been retracted and thereby exert a moment of force against the rotor. Mechanisms which have previously been employed to accomplish such uncaging functions include, for example retractable fingers which slideably contact a rotor shaft during spin up and which are suddenly retracted from the shaft, following spin up, to uncage the rotor. As will be apparent to those in the art, it is difficult to provide such a mechanism which will cause each finger to be released from the rotor shaft at precisely the same time. Certain of the prior-art uncaging devices have employed spring actuated release mechanisms, while others have employed solenoid actuators. At least one such prior-art system has employed an axially movable sleeve which is driven away from engagement with the rotor by the ignition of a propellant grain. The latter uncaging mechanism requires a rather complex array of biasing springs and relatively movable parts. It is, of course, desirable that the complexity of such instruments be minimized, because of both economic and reliability considerations.

It is, therefore, a major object of the present invention to provide a new means and method of uncaging a gyroscopic rotor upon its being accelerated to a desired spin velocity.

Another object is to provide such a means which, in application, is operable to uncage a gyroscopic rotor in such a manner that substantially no force is imparted to the rotor normal to the spin axis which would tend to effect an undesired nutation of the rotor subsequent to its release.

A further object is to provide such an uncaging means which incorporates substantially fewer moving parts than conventional uncaging mechanisms.

Yet another object is to provide such an uncaging means which, while providing the above-stated advantages, is nevertheless not of increased cost of manufacture relative to conventional devices but is of simplified, practicable manufacture.

In the drawing:

FIG. I is a longitudinal, sectional view of a gyroscope incorporating one embodiment of the present invention;

FIG. II is a partial cross-sectional view of the apparatus of FIG. I taken as on line II—II;

FIG. III is a diagrammatic representation of a gyroscope having a conventional uncaging mechanism;

FIG. IV is a diagrammatic representation, similar to FIG. III, of another embodiment of the invention; and FIG. V is a diagrammatic representation, similar to FIGS. III and IV, of still another embodiment.

With reference first to FIG. I, a gyroscopic instrument 10 having elements constructed in accordance with one embodiment of the invention is of a type known in the art as a two-degree-of-freedom, position reference instrument. It should be understood, of course, that the embodiment of FIGS. I and II is disclosed by way of example only, and that the invention, as defined by the appended claims, may take various forms in accordance with the particular application required, two of such additional forms being discussed hereinbelow with reference to FIGS. IV and V. In the embodiment of FIG. I, a rotor structure 11 is mounted for rotation upon a first bearing structure 12, the bearing structure 12 suitably comprising a spherical, universal bearing member 13 which is seated against the distal end of a tubular support 14 which extends laterally beyond the rotor structure 11. The tubular support 14 is coaxially related to the rotor structure 11 when the rotor structure is in its constrained or caged condition, as shown in FIG. I and as discussed more fully hereinafter. The tubular support 14 is suitably formed integrally with a circular mounting plate 15 which extends perpendicularly and radially from the tubular support and includes a peripheral flange 16 projecting from its surface opposite the rotor structure 11 and extending coaxially of the tubular support 14. The mounting plate 15 is adapted, suitably by a circumferential indentation 17 extending to its side facing the rotor structure 11, to receive a cylindrical, tubular member 20 which extends coaxially of the tubular support 14 and serves to enclose the rotor structure 11. The tubular member 20 is affixed to the mounting plate 15 by a weldment, not shown, or by other suitable fastening means. The tubular support 14 and circular mounting plate 15 thus serve as a housing 21 on which the bearing member 13 is rigidly mounted, by means of a bolt 22 which extends through the tubular member 14 and through a corresponding bore formed centrally through the bearing member 13, the bolt 22 being constrained by a nut 23 threadingly engaged with the bolt and tightened against the mounting plate 15. The housing would, of course, take other forms in other applications and embodiments wherein it may comprise a partially open frame or the like, not shown. The rotor structure 11 and its bearing structure 12 also would vary in construction and proportions in accordance with the particular application and are disclosed herein by way of illustration only. It will be recognized that the exemplary bearing structure 12 constitutes a ball bearing assembly permitting universal rotation of the rotor structure 11. Ball bearings 24 are seated rotatably within recesses or races, suitably formed in the spherical bearing member 13, for rotatably supporting the rotor structure 11, as is common practice, although an air bearing, not shown, could be used instead in accordance with principles well-known to those in the art. Alternatively, the bearing structure 12 may constitute a conventional, gimbal mounting.

In the present embodiment, the rotor structure 11 is in the form of a hollow toroid bisected cross sectionally into first and second annular segments 25 and 26, respectively, which have respective, mutually confronting, circumferentially extending and radially projecting flanges 27. A circular clamp ring 28, comprising a circular band of U-shaped, local cross section, is extended circumferentially around the radially projecting flanges 27 for constraining the flanges in firm, mutual contact whereby a seal is formed between the two rotor segments 25, 26. The radial flanges 27 project within the clamp ring 28, and fasteners, such as rivets 30, are fastened through the legs defined in cross section by the U-shaped clamp ring 28 and through the radial flanges 27, which extend between the legs at mutually spaced locations around the rotor periphery, as is shown more clearly in FIG. II. As is also seen more clearly in FIG. II, a plurality of turbine buckets or blades 31 are formed on the periphery of the clamp ring 28 for receiving a propellant gas directed tangentially against the blades to effect rotational acceleration of the rotor structure 11. The propellant may be a source of compressed gas (not shown) or, as in the preferred embodiment of FIGS. I and II, a solid propellant charge 32. Referring to FIG. I, an annular combustion chamber 33 is defined by a cylindrical member 34 mounted coaxially within the tubular member 20, adjacent the turbine blades 31 of the clamp ring 28, and constrained against first and second spacer rings 35 and 36 which are seated against the inner surface of the tubular member 20 in coaxial alignment with the member 20, between and respectively adjacent the opposite end portions of the cylindrical member 34. The tubular member 20 and the cylindrical member 34 are sealingly constrained against the intermediate spacer rings 35, 36 by suitable fasteners. The propellant charge 32 is in the form of a solid propellant body of annular configuration, mounted coaxially within the combustion chamber 33, and affixed to the inner surface of the tubular member 20 by a suitable adhesive, not shown. Also mounted within the combustion chamber 33 is at least one detonative squib 37, suitably of the electrically actuated type, for igniting the propellant charge 32, the squib 37 having electrical connection to an ignition lead 38 which extends from the combustion chamber 33 through a bore formed through the second spacer ring 36, from which the lead 38 is passed outwardly from the tubular member 20 through an opening 39 as a part of an insulative harness 40. As shown more clearly in FIG. II, orifices 43 are formed through the cylindrical element 34 and directed toward the force-receiving surfaces of the turbine buckets 31 for driving the rotor structure 11 in a counterclockwise rotational direction, as viewed in FIG. II, upon ignition of the annular propellant charge 32.

The propellant charge 32 is a solid composite propellant preferably of a relatively high burn rate, e.g., of the order of 1.5 inches per second at 1,000 p.s.i., so that the rotor 11 may be quickly brought up to spin velocity prior to the uncaging of the rotor, as will be discussed hereinafter with reference to the uncaging structure 67. As an example, one suitable propellant material is that available from the Thiokol Corporation and designated TPH 7023. The quantity of propellant required for the charge 32 to produce a desired acceleration of a rotor of a given moment of inertia within a predetermined period of acceleration is best determined empirically because of the several variables which must be taken into account. In one embodiment, as an example, a charge 32 having an O.D. of about 2.4 inches, a width of about 0.88 inches, and a thickness of about 0.073 inches was suitable in achieving spin up of a rotor structure, having a moment of inertia of about 0.00115 pound inch (seconds)$^2$, to a spin velocity of about 12,000 rpm in less than 0.060 seconds. A plurality of twelve orifices 43 are employed, each having a diameter of approximately 0.1 inches.

Referring additionally to FIG. I, the exemplary gyroscopic instrument 10 is of a type intended to be mounted coaxially within the nose section of a missile, not shown, for generating a corrective thrust through one or more of four control ports (ports 44A, 44B, and 44C being shown in FIG. I) formed in the tubular member 20 and the rocket body at 90° angular increments. The ports 44A, B, and C, and a fourth port, not shown, communicate with corresponding passageways 45 formed through a quadrant deflector 46. Such corrective, gas reactive guidance techniques are known in the art and are thus not to be described in detail herein except insofar as is necessay to illustrate the utility of the uncaging and accelerating mechanisms. Briefly summarizing the gas reactive guidance system, a solid propellant charge 47 is formed within the interior volume 48 of the rotor structure 11, the charge 47 being of annular configuration, suitably divided into segments 47A, 47B seated coaxially against the radially outermost portions of the rotor segments 25, 26, respectively. The second rotor segment 26 is continuous with an axisymmetrical, tubular portion 50 which extends in the direction opposite the rotor tubular support 14. The tubular rotor portion 50 is in communication with the rotor interior volume 48 through a channel 51 which extends between spacer members 52 (see also FIG. II) fastened between the first and second rotor segments 25, 26 at angularly spaced locations spaced radially inwardly from the rotor structure interior volume 48. The tubular rotor portion 50 thus extends toward the quadrant deflector 46, and the interior surface of the tubular portion 50, adjacent its distal end portion, defines a venturi nozzle, hereinafter termed the nozzle 53, for directing a jet of gas flow toward the quadrant deflector 46. The propellant charge 47 within the rotor structure interior volume 48 is ignited by means such as first and second pyrotechnic squibs 54 and 55 mounted between the two propellant segments 47A, 47B at diametrically opposite portions of the rotor structure 11. The squibs 54, 55 are suitably ignited by a pyrotechnic transfer cord 56 having dual extensions which extend from the respective squibs 54, 55 and from the rotor interior volume 48, through the channels 51, the extensions converging into a single cord within the rotor tubular portion 50, the cord 56 extending from the rotor tubular portion 50 through an opening 57 formed through the tubular housing member 20. Alternatively, the cord may be extended through opening 39 along with the igniting leads 78A, 78B, and 38.

In its caged mode, as illustrated in FIG. I, the rotor structure 11 is constrained from rotation, relative to the housing 21, about any axis except the spin axis of the rotor structure 11, which axis is indicated by the line 60. The rotor structure 11 is initially constrained by a constraining means 61 mounted on the housing and spaced from the first bearing structure 12. The constraining means 61 includes, in the present embodiment, an annular mounting ring 62 mounted on the tubular member 20, the mounting ring 62 being coaxially affixed to the interior surface of the tubular member 20 by any suitable means, such as a weldment, not shown, at a location spaced along the axis 60 from the first bearing structure 12 and, in the present embodiment, adjacent the portion of the rotor tubular portion 50 defining the nozzle 53.

Mounted coaxially within the mounting ring 62 is a second, annular bearing structure 63, which includes an outer, annular member 64 fixedly seated within the mounting ring 62 and an inner, annular member 65, the members 64, 65 defining a bearing race for ball bearings 66 upon which the inner bearing member 65 is thus free to rotate about the axis 60.

Mounted within the second bearing structure 63 is a solid propellant caging structure 67, which comprises an annular disc comprising a solid propellant grain in a solid matrix. While various propellant formulations may be employed in accordance with the particular application, the caging structure propellant 67 is suitably a composite employing aluminum for fuel, carboxyl terminated, polybutadiene as a binder, and ammonium perchlorate as an oxidizer. It is preferable that the propellant of the caging structure 67 have a somewhat slower burn rate than that of the rotor spinup propellant 32. As an example, a commercially available propellant manufactured by the Thiokol Corporation of Newton, PA as TPH 3219 and having a burn rate of the order of 1.1 inches per second at 1,000 psi is suitable. Thiokol propellant TPH 3003 is another suitable composition. The annular caging structure 67 is preferably seated coaxially within an annular gasket 70 of a substance, such as a phenol formaldehyde or other phenolic resin, which is readily machinable to an outer diameter which will permit the caging structure 67 and gasket 70 to be conveniently press fitted within the inner, rotatable bearing member 65, the caging structure and gasket being coaxially mounted within the bearing structure 63. A plurality of bores 68 are preferably formed through the propellant caging structure 67 at regular angular intervals for enhancing the consistency of burn of the structure 67 in operation, as described below.

The caging structure 67 defines a circular opening 71 extending coaxially through the caging structure 67, and the axisymmetrical, tubular portion 50 of the rotor structure 11 extends within and through the opening 50 and is, in the preferred embodiment, affixed to the caging structure 67 by a suitable adhesive 72. Accordingly, the rotor structure 11, in its initial or caged mode, is rotatable upon the first and second bearing structures 12 and 63 with the caging structure 67, but is prevented or constrained by the constraining means 61 from rotation about any other axis about which the rotor structure 11 would otherwise be free to rotate (upon the universal, first bearing structure 12). For example, such other axes would include the axis, represented by point 73 of FIG. I, extending centrally through the first bearing structure 12 and perpendicularly to the plane of the drawing.

The disc-shaped, annular caging structure 67 preferably is provided, on its planar side surfaces, with a coating 74 of a pyrotechnic substance having a substantially higher burn rate than that of the solid propellant 67, suitably a granular, black powder adhered to the explosive structure by a suitable adhesive.

Adjacent the caging structure 67 is mounted at least one, and preferably two detonating squibs 75A, 75B, the detonating squibs 75A, 75B being supported within suitable holders 76A, 76B having legs 77A, 77B, the legs 77A, 77B being affixed, suitably by spot welding or the like, to the mounting ring 62 at 180 degree angular intervals, i.e., at diametrically opposite locations, and on opposite sides of the mounting ring 62. The detonating squibs 75A, 75B are directioned toward the fast burning coatings 74 on the respective, adjacent sides of the caging structure 67 for igniting the coatings 74 at an appropriate time, as will be discussed below. Electrical ignition leads 78A, 78B for the two detonating squibs 75A, 75B, respectively, are extended through the opening 39 and suitably extend within the wire harness 40.

In operation, the rotor structure 11 is rotationally accelerated about its spin axis 60 immediately prior to the required use of the gyroscopic instrument 10 in the vehicle, not shown, in which the instrument 10 is mounted, e.g., immediately prior to launching of a missile or the like, in which such instruments 10 are normally mounted coaxial of the major axis of the vehicle. In the embodiment of FIGS. I and II, a tangential force producing rotational acceleration of the rotor structure 11 is provided by the annular propellant charge 32 mounted within the combustion chamber 33. When acceleration is desired, an electrical current is applied to the squib 37 through the lead 38 from an external source of power, not shown, in accordance with practices known in the art. Expanding gasses released by the propellant charge 32 quickly increase the pressure within the combustion chamber 33, which results in the ejection of jets of gas through the orifices 43 and toward the turbine blades 31, thereby rapidly accelerating the rotor structure 11 to a desired span velocity. Simultaneous with or momentarily subsequent to the ignition of the accelerative propellant charge 32, an electrical signal is also applied to the detonating squibs 75A and 75B directioned toward the caging structure 67. Detonation of the squibs 75A, 75B ignites the fast burning coating 74, which ignites the solid propellant caging structure 67. Upon acceleration of the rotor structure 11 to a predetermined spin velocity the solid propellant caging structure 67 is consumed, whereupon the rotor structure is uncaged and released from any constraint against its rotation about the axis 73; more precisely, in the present embodiment the rotor structure is then free to rotate universally about the bearing structure 12.

It is necessary that the rotor structure 11 be fully accelerated prior to its uncaging. To achieve this end, it is preferred that the spinup propellant charge 32 have a burn rate which is faster than that of the caging structure propellant. In practice, it has been found that a caging structure 67 employing the Thiokol TPE 3003 propellant and having a thickness of 0.25 inches, an inner diameter of 0.375 inches, and an outer diameter of 0.670 inches and having sixteen of the mutually spaced bores 68, each being of 0.030 inches diameter, will have a burn time of approximately 80 to 100 milliseconds.

Spin up of the rotor structure within this time period is readily obtainable. If a longer spin up time is required, a propellant of slower burn rate may be used for the caging structure 67, and/or a propellant of higher burn rate may be used for the spin up propellant charge 32. Alternatively, the ignition of the squibs 75A, 75B may be delayed for an appropriate time interval by suitable ignition timing sequence instrumentation, not shown, according to practices known in the art.

In the present, illustrative application, the pyrotechnic transfer cord 56 is also ignited at the same time and from the same signal source of squibs 75A, 75B to permit burning of the detonating cord 56 and detonation of the squib or igniter charges 55, 54 during rotational acceleration of the rotor structure 11, whereby the discharged squibs or igniter charges become dynamically balanced during or before rotational acceleration of the rotor structure 11. The propellant charge 47 is thereby ignited and expanding gasses produced by the charge 47 are ejected through the channel 51 and the nozzle 53 toward the quadrant deflector 46. The operation of the quadrant deflector 46 and the rotor structure 11 to cause corrective, radially directed gaseous flow through the openings 44A, B, C, is accomplished according to principles known in the art. A deviation of the vehicle from its original orientation, i.e., a pitching or yawing movement, results in a pitching or yawing movement of the housing 21 relative to the spinning rotor 11, whereupon the housing 21 rotates relative to the rotor structure, and the tubular rotor portion 50 may then lie along an axis such as that designated by line 80 to FIG. I, the rotor structure 11 having rotated relative to the housing 21 about the axis 73. Gas ejected through the nozzle 53 is then directioned primarily through control port 44A for imparting a corrective moment of force to the vehicle.

The use of the propellant charge 32 as a means for imparting rotational acceleration to the rotor 11 provides the advantages of compactness, rapid acceleration, and compatibility with the propellant caging structure 67 because of the common ignition means, and because of the provision of a means for eliminating requirement for external timing delay circuitry or mechanized delay mechanisms, in that the sequencing of uncaging and rotational acceleration of the rotor structure may be controlled by varying the size, configuration, and burn rates of the two propellants 32 and 67. It should, of course, be understood that alternative accelerative means, such as compressed air cylinders or spring powered mechanisms, are also useful in other applications and embodiments. Moreover, it will be understood that the constraining means 61 and caging structure 67 will take various forms in accordance with the particular application. In FIG. IV, for example, the rotor structure 11A is illustrated diagrammatically as being of annular configuration, rotatable universally upon a suitable bearing means 12A, such as an air bearing, supported upon a shaft 83 affixed to a housing 21A. The rotor 11A is initially within a circumferentially extending, annular caging structure 67A rotatably seated in an annular bearing structure 63A. The rotor structure 11A is thus initially constrained by the constraining means 61A, comprising the bearing 63A and the caging structure 67A, from rotation about any axis, such as the axis represented by point 73A, except the spin axis 60A. Rotational acceleration of the rotor 11A about the spin axis 60A is effected, for example, by a hysteresis electrical motor, represented by windings 81A arrayed annularly about the shaft 83. The position of the rotor 11A subsequent to its uncaging, by combustion of the propellant caging structure 67A, is sensed by a position sensor 82 which is suitably an electromagnetic or other suitable sensor or other suitable type, according to the requisites of the particular application. The representation of FIG. IV is, of course, diagrammatic, but illustrats that the caging structure 67A may be positioned centrally and peripherally of the rotor element 11A rather than about an extending shaft as in the embodiment of FIG. I. In the embodiment represented in FIG. V, wherein components 11B, 12B, 21B, 60B, 61B, 63B, 67B, and 81B correspond to components 11A, 12A, 21A, 60A, 61A, 63A, 67A, and 81A, respectively, of FIG. IV, the constraining means 61B comprises a caging structure 67B formed as an annular ring connected between a side surface of the rotor 11B and an annular bearing surface 63B positioned to one side of the rotor structure 11B, rather than extending centrally and circumferentially of the rotor 11B. In the embodiment of FIG. V, the motor windings 81B are arrayed circumferentially around the rotor 11B. The diagrammatic representation of FIG. III is of a gyroscope similar to the embodiment of FIG. V but employing conventional, solenoid actuated uncaging mechanisms 84 which include fingers 85 which are retracted from contact with the rotor 11C following spin up. While the uncaging mechanisms 84 of FIG. III is also represented only diagrammatically, the representation illustrates the difficulties which have been entailed in such conventional uncaging mechanisms wherein constraining elements must be released simultaneously from at least two portions of a rotor if unbalanced forces applied to the rotor 11C at the moment of retraction of the finger elements 85 are to be avoided. Such inaccuracies are minimized by the use of the constraining means (61, 61A, or 61B) of the present invention wherein spurious moments of force resulting from the uncaging action are, according to my experiments, present in only a minute and inconsequential degree. While the precise characteristics of the dissipation of the solid propellant caging structures 67, 67A, and 67B subsequent to ignition are not fully known, it is believed that the precision of the uncaging procedure results from the rapid combustion of the propellant caging structures, from uniformity of grain in the composite propellant, and chiefly from symmetrical combustion of the caging structures because of ignition of the caging structures 67 along a symmetrical, annular path because of the high rotational velocities of the propellant caging structures during ignition. Accordingly, the method of uncaging a gyroscopic rotor structure constructed according to the above disclosure and wherein the solid propellant caging structure is ignited, according to the disclosure, by fixed ignition means such as the squibs 75A, 75B confronting a rotating caging structure provides the new and advantageous result that the propellant is consumed evenly, and releases the rotor with a minimum degree of lateral "kick." Thus, the propellant is used to achieve a result exactly opposite the result normally obtained from the combustion of a propellant adjacent a relatively movable body, i.e., the normally obtained impartation of a reactive force which effects acceleration and displacement of the adjacent body.

It will thus be seen that the disclosed means and method for uncaging a gyroscopic rotor provides an efficient solution to many of the problems inherent in conventional uncaging mechanisms and techniques. It will be recognized by those in the art that the disclosed apparatus for permitting rotational acceleration of the rotor about its spin axis and for subsequently releasing the rotor to permit its rotation about at least one other axis is not of increased complexity relative to conventional mechanisms, but rather is of simplified, practicable manufacture, employing only one relatively movable structure rather than a plurality of movable parts as has been required in conventional uncaging mechanisms.

While only one embodiment of the invention, together with modifications thereof, has been described in detail herein and shown in the accompanying drawing, it will be evident that various further modifications are possible in the arrangement of its components without departing from the scope of the invention.

What is claimed is:

1. For a gyroscope adapted for use in a vehicle intended for a single usage, the gyroscope having a rotor and means for rotationally accelerating the rotor upon its spin axis, relative to a supporting structre, to a predetermined rotational velocity, apparatus for permitting rotational acceleration of the rotor about its spin axis while constraining the rotor against rotation about another axis and, upon the rotor being accelerated to a predetermined rotational velocity, for releasing the rotor to permit its rotation about at least one other axis relative to the supporting structure, the apparatus comprising:
    a housing;
    a first bearing means, mounted on the housing, for permitting rotation of the rotor upon the rotor spin axis and upon at least one other axis intersecting the spin axis;
    constraining means, mounted on the housing and spaced from the first bearing means, for initially constraining the rotor from rotation relative to the housing about the at least one other axis while permitting rotation of the rotor about its spin axis, and for subsequently releasing the rotor, upon the rotor being accelerated to its predetermined rotational velocity, to permit rotation of the rotor relative to the housing about the at least one other axis, the constraining means having a solid propellant structure which comprises a means for caging the rotor prior to release of the rotor; and
    means for igniting the solid propellant structure for causing the solid propellant structure to be consumed subsequent to the rotor being accelerated to its predetermined rotational velocity, whereby the rotor is permitted to rotate about the at least one other axis relative to the housing.

2. The apparatus of claim 1, wherein the rotor includes an axisymmetrical portion extending coaxially along the spin axis and within the constraining means.

3. The apparatus of claim 2, wherein the solid propellant structure defines an opening, the axisymmetrical rotor portion extending within the opening and being constrained within the solid propellant structure prior to ignition of the solid propellant structure.

4. The apparatus of claim 3, wherein the constraining means includes an annular, second bearing, the second bearing being mounted on the housing coaxially of the spin axis of the rotor, the solid propellant structure comprising an annular sleeve coaxially and rotatably mounted within the second bearing, the axisymmetrical rotor structure being immovably seated within the solid structure, propellant body, whereby the solid propellant structure is caused to rotate with the rotor during rotational acceleration of the rotor.

5. A method for uncaging a gyroscope rotor following acceleration of the rotor to a predetermined rotational velocity, the method comprising:
    providing a housing and a first bearing means, mounted on the housing, for permitting rotation of the rotor upon its spin axis and upon at least one other axis intersecting the spin axis;
    providing a constraining means, mounted on the housing and spaced from the first bearing means, for initially preventing rotation of the rotor about the at least one other axis while permitting rotation about the spin axis, the constraining means having a solid propellant structure in which a portion of the rotor is initially caged; and
    igniting the solid propellant structure, upon the rotor being accelerated, for causing the solid propellant structure to be consumed following rotational acceleration of the rotor and for thereby uncaging the rotor.

6. For a gyroscope adapted for use in a vehicle intended for a single usage, the gyroscope having a rotor adapted to be rotationally accelerated upon its spin axis, relative to a supporting structure, apparatus for rotationally accelerating the rotor about its spin axis while constraining the rotor against rotation about another axis and, upon the rotor being accelerated to a predetermined rotational velocity, for releasing the rotor to permit its rotation about at least one other axis relative to the supporting structure, the apparatus comprising:
    a housing;
    a first bearing means, mounted on the housing, for permitting rotation of the rotor upon the rotor spin axis and upon at least one other axis intersecting the spin axis;
    means for rotationally accelerating the rotor about its spin axis, the means for rotationally accelerating the rotor comprising a solid propellant charge, means for igniting the charge, means for directing the resultant gasses toward the rotor, and means on the rotor for reacting against the gasses;
    constraining means, mounted on the housing and spaced from the first bearing means, for initially constraining the rotor from rotation relative to the housing about the at least one other axis while permitting rotation of the rotor about its spin axis, and for subsequently releasing the rotor, upon the rotor being accelerated to its predetermined rotational velocity, to permit rotation of the rotor relative to the housing about the at least one other axis, the constraining means having a solid propellant structure which comprises a means for caging the rotor prior to release of the rotor; and
    means for igniting the solid propellant structure for causing the solid propellant structure to be consumed subsequent to the rotor being accelerated to its predetermined rotational velocity, whereby the rotor is permitted to rotate about the at least one other axis relative to the housing.

* * * * *